United States Patent
Moriyama et al.

(10) Patent No.: US 8,532,887 B2
(45) Date of Patent: Sep. 10, 2013

(54) HYDRAULIC CONTROL APPARATUS

(75) Inventors: Shuji Moriyama, Susono (JP); Akira Murakami, Gotenba (JP); Keisuke Ichige, Aichi-gun (JP); Hiroyuki Nishizawa, Tajimi (JP); Masanori Iritani, Nagoya (JP); Hideyuki Suzuki, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 323 days.

(21) Appl. No.: 12/936,481

(22) PCT Filed: Apr. 14, 2009

(86) PCT No.: PCT/IB2009/005229
§ 371 (c)(1),
(2), (4) Date: Oct. 5, 2010

(87) PCT Pub. No.: WO2009/127936
PCT Pub. Date: Oct. 22, 2009

(65) Prior Publication Data
US 2011/0046861 A1    Feb. 24, 2011

(30) Foreign Application Priority Data
Apr. 15, 2008  (JP) ................. 2008-105950

(51) Int. Cl.
*G06F 9/00* (2006.01)
*F04B 49/24* (2006.01)
*F16D 43/25* (2006.01)

(52) U.S. Cl.
USPC ................ 701/51; 701/68; 417/281

(58) Field of Classification Search
USPC ............... 701/51, 67; 417/279, 281, 282, 417/283; 192/3.21, 3.28
See application file for complete search history.

(56) References Cited

U.S. PATENT DOCUMENTS

| 4,680,928 A | 7/1987 | Nishikawa et al. |
| 5,857,162 A | 1/1999 | Vukovich et al. |
| 5,954,618 A | 9/1999 | Mikami et al. |

(Continued)

FOREIGN PATENT DOCUMENTS

| CN | 101021266 A | 8/2007 |
| DE | 33 23 158 A1 | 1/1984 |

(Continued)

OTHER PUBLICATIONS

International Search Report issued Jul. 6, 2009 in PCT/IB09/05229 filed Apr. 14, 2009.

(Continued)

*Primary Examiner* — Thomas Tarcza
*Assistant Examiner* — Edward Pipala
(74) *Attorney, Agent, or Firm* — Oblon, Spivak, McClelland, Maier & Neustadt, L.L.P.

(57) ABSTRACT

A switching apparatus is provided in a hydraulic control apparatus having a fluid transmission apparatus; a lockup clutch; a switching valve that controls engagement of the lockup clutch; and a control oil pressure generation apparatus that pressurizes oil and outputs a control oil pressure to control activation of the switching valve. The switching apparatus executes a control to warm the oil input into the control oil pressure generation apparatus if the temperature of the oil is below a predetermined temperature and prohibits execution of the control to warm the oil input into the control oil pressure generation apparatus if the temperature of the oil equals or exceeds the predetermined temperature.

12 Claims, 12 Drawing Sheets

(56) References Cited

U.S. PATENT DOCUMENTS

| | | |
|---|---|---|
| 7,207,922 B2 | 4/2007 | Kuhstrebe et al. |
| 2004/0112171 A1 | 6/2004 | Kuhstrebe et al. |
| 2005/0261108 A1 | 11/2005 | Kuhstrebe et al. |
| 2007/0186981 A1 | 8/2007 | Fukushima et al. |

FOREIGN PATENT DOCUMENTS

| | | |
|---|---|---|
| DE | 197 37 413 | 3/1998 |
| DE | 10 2007 005 689 A1 | 8/2007 |
| EP | 0 658 708 | 6/1995 |
| EP | 0 751 323 | 1/1997 |
| FR | 2 529 625 | 1/1984 |
| JP | 59 6461 | 1/1984 |
| JP | 64 6558 | 1/1989 |
| JP | 4 46259 | 2/1992 |
| JP | 4 75424 | 3/1992 |
| JP | 10 159927 | 6/1998 |
| JP | 11 22819 | 1/1999 |
| JP | 2002 156031 | 5/2002 |
| JP | 2003 83443 | 3/2003 |
| JP | 2006 307950 | 11/2006 |
| JP | 2007 211968 | 8/2007 |

OTHER PUBLICATIONS

Office Action issued Feb. 18, 2010 in Japanese Patent Application 2008-105950 filed Apr. 15, 2008 (with partial English translation).

HYDRAULIC CONTROL APPARATUS

BACKGROUND OF THE INVENTION

1. Field of the Invention

The invention relates to a hydraulic control apparatus that controls engagement of a clutch provided in parallel with a fluid transmission apparatus on a path for transmitting power output from a power source.

2. Description of the Related Art

In a conventional transmission, the transmission is disposed on a power transmission path extending from an engine to a vehicle wheel in order to transmit the power of the engine to the vehicle wheel, and an automatic transmission is available in which a multi-stage transmission including a planetary gear mechanism is used as such a transmission, and a gear ratio of the transmission is switched by operating a frictional engagement apparatus such as a clutch or a brake. A continuously variable transmission employing a belt and a pulley is also available as a transmission. A technique of controlling the gear ratio of this type of automatic transmission using a hydraulic actuator is available, and an example of this technique is described in Japanese Patent Application Publication No. 2006-307950 (JP-A-2006-307950). In JP-A-2006-307950, an automatic transmission is connected to an output shaft of an engine via a torque converter. Further, an oil pump driven by the engine and an oil pump driven by an electric motor are provided, and the gear ratio of the automatic transmission is controlled by supplying pressurized oil ejected from the oil pumps to a hydraulic actuator. Furthermore, of the pressurized oil ejected from the oil pumps, surplus oil supplied to the hydraulic actuator is supplied to a lubricating system of the automatic transmission through a downstream oil passage. A warmer is disposed in the downstream oil passage such that at low temperatures, the pressurized oil is warmed by the warmer. As a result, supply delays in the working oil supplied to the hydraulic actuator may be reduced, and a favorable running performance can be obtained. Note that techniques for warming the working oil of a transmission are also described in Japanese Patent Application Publication No. 10-159927 (JP-A-10-159927) and Japanese Patent Application Publication No. 4-75424 (JP-A-4-75424).

Meanwhile, a vehicle in which a fluid transmission apparatus and a lockup clutch are provided on a power transmission path extending from a power source of the vehicle to a vehicle wheel is also available. When the lockup clutch is not engaged, slippage occurs in the fluid transmission apparatus, leading to power loss. Therefore, power loss may be avoided by engaging the lockup clutch. However, if the operating responsiveness of a switching valve for engaging and disengaging the lockup clutch is relatively low, vibration may occur during engagement of the lockup clutch even if working oil supplied to a hydraulic chamber for controlling the engagement of the lockup clutch is warmed.

SUMMARY OF THE INVENTION

The invention has been designed in consideration of the circumstances described above, and the invention provides a hydraulic control apparatus capable of improving the responsiveness of a clutch control mechanism for controlling transmission torque of a clutch.

According to one aspect of the invention, a hydraulic control apparatus that includes a clutch activated by an oil pressure and controlling a torque transmitted between a first rotary member and a second rotary member; a clutch control mechanism that is activated by a control oil pressure and controls the oil pressure for activating the clutch; a control oil pressure generation apparatus that modulates input oil pressure and outputs the modulated oil pressure to control the clutch control mechanism; and a switching apparatus that selectively switches between control in which thermal energy is applied to the oil input into the control oil pressure generation apparatus and control in which thermal energy is not applied to the oil input into the control oil pressure generation apparatus, is provided.

According to the hydraulic control apparatus described above, it is possible to switch selectively between control in which thermal energy is applied to the oil supplied to the control oil pressure generation apparatus, thereby increasing the temperature of the oil, and control in which thermal energy is not applied to the oil. Therefore, when the control oil pressure is generated by the control oil pressure generation apparatus and used to control activation of the clutch control mechanism, the responsiveness of the control oil pressure can be improved such that the clutch control mechanism can be activated smoothly. Hence, vibration caused by an increase in the transmission torque of the clutch can be suppressed at a relatively early stage.

The hydraulic control apparatus preferably further includes: a fluid transmission apparatus that includes a casing in which the first rotary member and the second rotary member are housed, that transfers power between the first rotary member and the second rotary member using kinetic energy of oil supplied to the casing; and an oil passage through which the oil that is supplied to the fluid transmission apparatus passes when the oil is discharged from the fluid transmission apparatus, wherein the clutch is oriented parallel to the fluid transmission apparatus, and the switching apparatus executes a control to apply thermal energy of the oil in the oil passage to the oil that is input into the control oil pressure generation apparatus.

According to the hydraulic control apparatus described above, a reduction in the transmission torque of the clutch causes slippage between the first rotary member and second rotary member, and as a result, the oil in the casing is agitated, leading to an increase in the temperature of the oil. This oil is discharged into the oil passage, whereupon the thermal energy of the oil is applied to the oil that is input into the control oil pressure generation apparatus. Thus, reliably warmed oil can be supplied to the control oil pressure generation apparatus.

Further, in the hydraulic control apparatus, the switching apparatus preferably includes a valve that opens when a temperature of the oil input into the control oil pressure generation apparatus is below a predetermined temperature, so that the oil in the oil passage flows into the control oil pressure generation apparatus, and that is closed when the temperature of the oil input into the control pressure generation apparatus equals or exceeds the predetermined temperature.

According to the hydraulic control apparatus described above, when the temperature of the oil input into the control oil pressure generation apparatus is below the predetermined temperature, the valve opens so that the thermal energy of the oil in the oil passage is applied to the oil in the control oil pressure generation apparatus. When the temperature of the oil input into the control oil pressure generation apparatus equals or exceeds the predetermined temperature, on the other hand, the valve is closed such that the energy of the oil in the oil passage is not applied to the oil in the control oil pressure generation apparatus. Thus, reliably warmed oil can be supplied to the control oil pressure generation apparatus.

The hydraulic control apparatus preferably further includes: a warming apparatus that executes a warming control to increase a temperature of the oil that is supplied to the fluid transmission apparatus by circulating the oil through a closed circulation circuit; a condition determination apparatus for determining whether a condition for opening the valve is satisfied based on whether the temperature of the oil input into the control oil pressure generation apparatus is below a predetermined temperature; and a warming control apparatus that executes the warming control if a rate of temperature change in the oil passage exceeds a predetermined value and the condition for opening the valve is satisfied and prohibits the warming control if the rate of change in the temperature of the oil passage is equal to or below the predetermined value.

According to the hydraulic control apparatus described above, the warming control can be performed by causing the fluid that is supplied to the fluid transmission apparatus and discharged from the fluid transmission apparatus to circulate through a closed circulation circuit such that the temperature of the fluid rises. Furthermore, when the temperature of the oil input into the control oil pressure generation apparatus is below the predetermined temperature, the valve is opened such that the thermal energy of the oil in the oil passage is applied to the oil in the control oil pressure generation apparatus, and thus the temperature of the oil in the control oil pressure generation apparatus is increased. Moreover, a determination is made as to whether or not the condition for opening the valve has been established. When the condition for opening the valve is established and the rate of change in the temperature of oil passage exceeds the predetermined value, the warming control can be performed. When the condition for opening the valve is satisfied but the rate of change in the temperature of oil passage is equal to or below the predetermined value, on the other hand, the valve cannot be opened, and because it may be impossible to apply the thermal energy of the oil in the oil passage to the oil in the control oil pressure generation apparatus, the warming control is prohibited. Thus, reliably warmed oil can be supplied to the control oil pressure generation apparatus.

The hydraulic control apparatus preferably further includes: an oil pump having a suction port that draws the oil to be supplied to the fluid transmission apparatus and an ejection port that ejects the drawn oil to supply the fluid transmission apparatus; and a return oil passage for returning a portion of the oil in the oil passage to the suction port.

According to the hydraulic control apparatus described above, the oil that is ejected from the pump is supplied to the fluid transmission apparatus, and a portion of the warmed oil in the casing of the fluid transmission apparatus is returned to the suction port of the pump through the oil passage and the return oil passage. Thus, the oil that is ejected from the oil pump can be warmed.

The hydraulic control apparatus preferably further includes: an oil temperature measurement apparatus for measuring a temperature of the oil that is ejected from the ejection port of the oil pump; and a return apparatus that returns a portion of the oil in the oil passage to the suction port through the return oil passage if the measured oil temperature is equal to or below a predetermined reference oil temperature.

According to the hydraulic control apparatus described above, the oil temperature of the oil ejected from the ejection port of the oil pump is measured, and when the measured oil temperature is equal to or below the predetermined reference oil temperature, a portion of the oil in the oil passage can be returned to the suction port through the return oil passage. Hence, the oil that is ejected from the oil pump can be warmed reliably.

Further, in the hydraulic control apparatus, the switching apparatus preferably includes a heat exchanger that applies thermal energy to the oil input into the control oil pressure generation apparatus by exchanging heat between the oil discharged into the oil passage from the casing and the oil input into the control oil pressure generation apparatus.

According to the hydraulic control apparatus described above, the thermal energy of the warmed oil in the casing is transmitted to the oil in the control oil pressure generation apparatus by the heat exchanger. Thus, reliably warmed oil can be supplied to the control oil pressure generation apparatus.

The hydraulic control apparatus preferably further includes: an oil pump for ejecting the oil to be supplied to the fluid transmission apparatus; a warming apparatus that executes a warming control to increase a temperature of the oil that is supplied to the fluid transmission apparatus by circulating the oil through a closed circulation circuit; an oil temperature measurement apparatus for measuring an oil temperature of the oil that is ejected from the oil pump; and a warming control apparatus that executes the warming control when the measured oil temperature of the oil is equal to or below a predetermined oil temperature, and prohibits execution of the warming control if the measured oil temperature of the oil exceeds the predetermined oil temperature.

According to the hydraulic control apparatus described above, the warming control can be performed by causing the oil that is supplied to the fluid transmission apparatus and discharged from the fluid transmission apparatus to circulate through the closed circulation circuit such that the temperature of the oil rises. Furthermore, when the oil temperature of the oil ejected from the oil pump is equal to or below the predetermined oil temperature, the warming control is executed, but when the measured oil temperature of the oil exceeds the predetermined oil temperature, the warming control is prohibited. Hence, the oil that is ejected from the oil pump can be warmed reliably and then supplied to the control oil pressure generation apparatus.

Further, in the hydraulic control apparatus, the switching apparatus preferably includes a heating wire that is energized to heat the oil that is input into the control oil pressure generation apparatus.

According to the hydraulic control apparatus described above, the heating wire generates heat when energized, and applies the resulting thermal energy to the oil that is supplied to the control oil pressure generation apparatus. Hence, the oil that is supplied to the control oil pressure generation apparatus can be warmed reliably.

Further, in the hydraulic control apparatus, the clutch is preferably a lockup clutch provided in a fluid transmission apparatus which includes a casing in which the first rotary member and the second rotary member are housed, that transfers power between the first rotary member and the second rotary member using kinetic energy of oil supplied to the casing, and the lockup clutch sets the first rotary member and the second rotary member in an engaged state, a disengaged state, or a slip state.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Next, embodiments of the invention will be described. A fluid transmission apparatus of the invention is disposed on a power transmission path extending from a power source to a driven member. The fluid transmission apparatus of this invention may be used in a vehicle, a machine tool, and so on. When the invention is used in a vehicle, the driven member includes a rotating vehicle wheel and other rotary elements such as a rotary shaft, a gear, a sprocket, a chain, a belt, and a pulley. The fluid transmission apparatus is then disposed on a power transmission path extending from the power source to the vehicle wheel. When the invention is used in a machine tool, the driven member is a rotating or reciprocating work piece or tool, and the fluid transmission apparatus is disposed on a power transmission path extending from the power source to the work piece or tool. Regardless of whether the fluid, transmission apparatus of this invention is used in a vehicle or a machine tool, the power of the power source is transmitted to the driven member via a first rotary member and a second rotary member. The power source includes an engine, an electric motor, a hydraulic motor, a flywheel, and so on. Further, the fluid transmission apparatus may be a torque converter that functions to amplify torque transmitted between the first rotary member and the second rotary member, or a fluid coupling not having a torque amplification function. The first rotary member and second rotary member according to the invention are torque-transmitting elements, and include rotary elements such as a rotary shaft, an impeller, a gear, a sprocket, a chain, a belt, a pulley, a casing, and a connecting drum. An oil passage according to the invention is a passage through which oil passes, and includes an opening portion, a port, a groove, a recess, a valve, and an oil passage.

Figure 2:
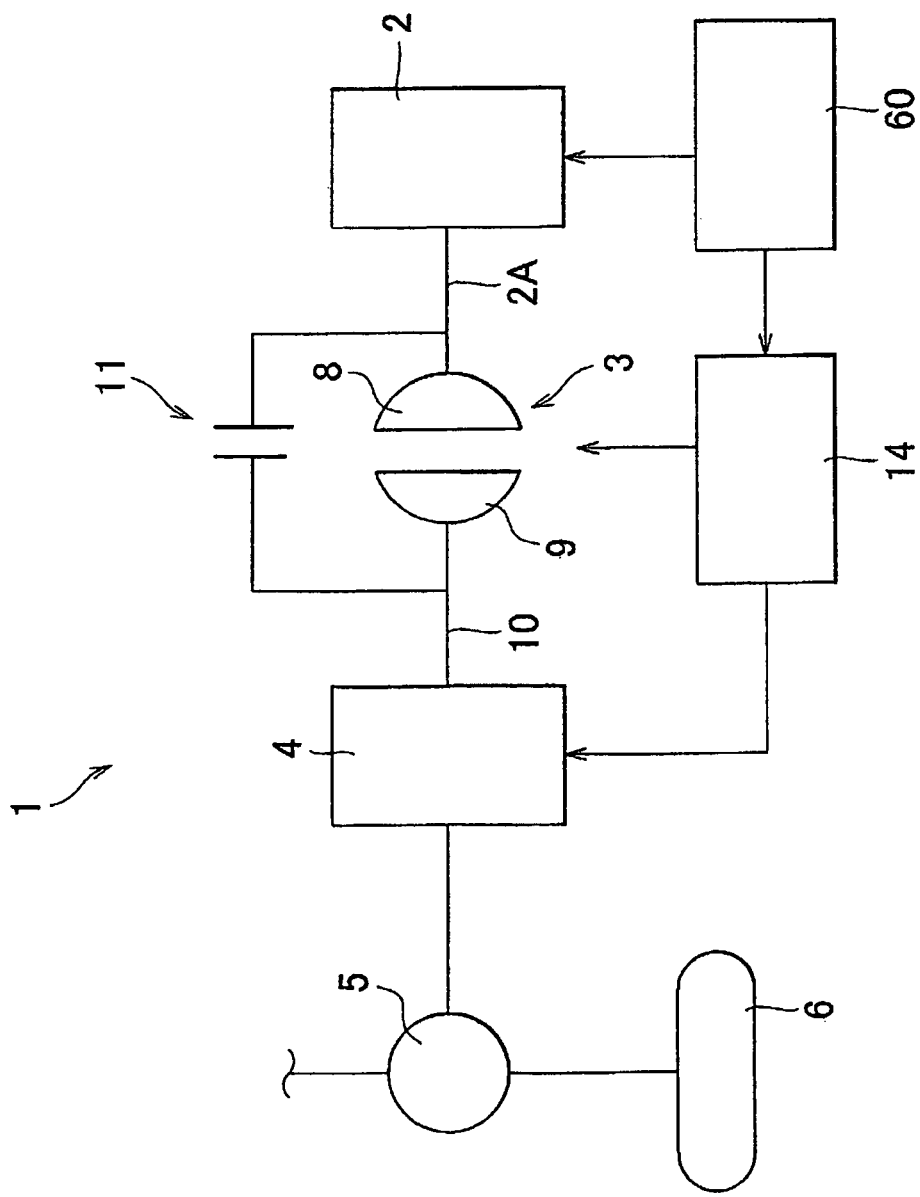
FIG. 2 is a schematic diagram of a vehicle having the hydraulic control apparatus according to an embodiment of the invention.

FIG. 2 shows the power train of a vehicle that includes the fluid transmission apparatus according to the invention, and a control system of the vehicle. In a power train of a vehicle 1 shown in FIG. 2, power from a drive source 2 is transmitted to a torque converter 3, which serves as a type of fluid transmission apparatus. Torque output from the torque converter 3 is transmitted to a vehicle wheel 6 via a transmission 4 and a final reduction gear 5. At least one of an engine and an electric motor may be used as the drive source 2. The engine is a power apparatus that burns fuel and converts resulting thermal energy into kinetic energy, and an internal combustion engine, or more specifically a gasoline engine, a diesel engine, an LPG engine, and so on, may be used as the engine. The electric motor is a rotary apparatus that converts electric energy into kinetic energy, and may be an alternating current motor or a direct current motor. Further, instead of an electric motor, a motor/generator that functions as both a motor and a generator may be used. In the embodiment to be described below, a gasoline engine is used as the drive source 2, and for convenience, the drive source 2 will be referred to as an "engine 2".

The engine 2 and the torque converter 3 are connected to be capable of transmitting power. The constitution of the torque converter 3 will now be described with reference to FIG. 1. The torque converter 3 includes a hollow casing 7. The casing 7 is connected to a crankshaft 2A of the engine 2 to be capable of transmitting power. A pump impeller 8 that rotates integrally with the casing 7 is provided. Further, a turbine runner 9 is provided in the interior of the casing 7. The turbine runner 9 is connected to an input shaft 10 of the transmission 4 to be capable of transmitting power, and rotates integrally with the input shaft 10. The pump impeller 8 and the turbine runner 9 are both constituted by impellers. A lockup clutch 11 that connects the input shaft 10 and the pump impeller 8 using frictional force is also provided. The lockup clutch 11 is a mechanism for controlling transmission torque or torque capacity.

The lockup clutch 11 includes a piston that rotates integrally with the input shaft 10 and is capable of operating in the direction of an axis that forms a rotation center of the input shaft 10, a disc-shaped hub formed on the piston, and a friction material attached to the hub. When the piston is operated in the axial direction, the friction material may be brought into contact with an inner surface of the casing 7 and separated from the inner surface of the casing 7. When the friction material contacts the casing 7, the lockup clutch 11 is engaged, and when the friction material is separated from the casing 7, the lockup clutch 11 is disengaged. Further, an engagement hydraulic chamber 12 and a disengagement hydraulic chamber 13 are formed in the interior of the casing 7. The engagement hydraulic chamber 12 is formed between the hub and the pump impeller 8, and the disengagement hydraulic chamber 13 is formed between the hub and a front cover of the casing 7. The engagement hydraulic chamber 12 and the disengagement hydraulic chamber 13 are connected, and the piston is moved (operated) in the axial direction by a differential pressure between the engagement hydraulic chamber 12 and the disengagement hydraulic chamber 13. Note that a stator 62 is disposed on the inside of the pump impeller 8 and the turbine runner 9. The stator 62 is used to amplify torque transmitted between the pump impeller 8 and the turbine runner 9.

Figure 1:
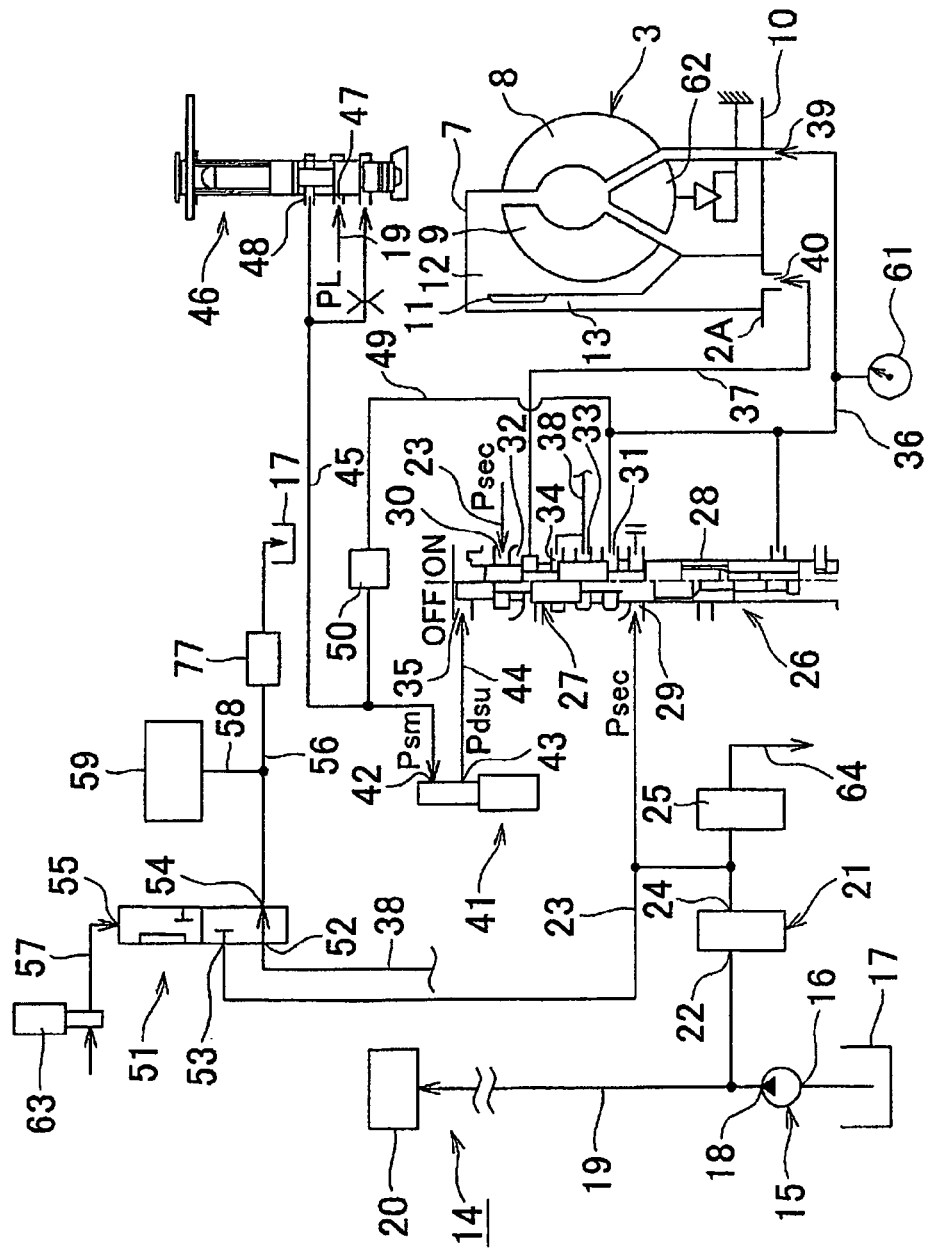
FIG. 1 is a schematic diagram showing a hydraulic control apparatus according to a first embodiment of the invention.

Next, the interior of the torque converter 3, or more specifically a first embodiment of a hydraulic control apparatus 14 for supplying working oil to the interior of the casing 7, will be described with reference to FIG. 1. An oil pump 15 for supplying oil to the hydraulic control apparatus 14 is provided. The oil pump 15 is driven by the engine 2 or a motor (not shown), and any rotating or reciprocating oil pump, for example a gear pump, a vane pump, a plunger pump, or a piston pump, may be used as the oil pump 15. A suction port 16 of the oil pump 15 is connected to an oil pan 17. Oil is stored in the oil pan 17. Further, an oil passage 19 is connected to an ejection port 18 of the oil pump 15.

Pressurized oil ejected into the oil passage 19 is supplied to a pressurized oil requiring portion 20. The pressurized oil requiring portion 20 includes a hydraulic chamber of a hydraulic actuator for controlling a gear ratio of the transmission 4. A pressure control valve (primary regulator valve) 21 for controlling the line pressure PL of the oil passage 19 is provided. The pressure control valve 21 includes an input port 22 connected to the oil passage 19 and a drain port 24 connected to an oil passage 23. The pressure control valve 21 controls the line pressure in the oil passage 19 by controlling the oil amount discharged from the oil passage 19 to the oil passage 23 via the drain port 24. Further, a pressure control valve (secondary regulator valve) 25 for controlling the oil pressure in the oil passage 23 is provided. The pressure control valve 25 controls the oil pressure of the oil passage 23 by controlling an oil amount discharged from the oil passage 23 to an oil passage 64. Pressure control characteristics of the pressure control valves 21, 25 are controlled by an electronic control apparatus to be described below.

Further, a lockup clutch control valve (to be referred to as a "switching valve" hereafter) 26 is connected to the oil passage 23. The switching valve 26 controls engagement of the lockup clutch 11, and includes a spool 27 that moves linearly, a spring 28 for applying a unidirectional force to the spool 27, two input ports 29, 30, two output ports 31, 32, two drain ports 33, 34, and a signal pressure port 35. The spool 27 is operated by a signal oil pressure input into the signal pressure port 35. Further, the input ports 29, 30 are both connected to the oil passage 23, the output port 31 is connected to an oil passage 36, the output port 32 is connected to an oil passage 37, and the drain ports 33, 34 are connected to an oil passage 38. Further, the oil passage 36 is connected to the engagement hydraulic chamber 12 via a port 39, and the oil passage 37 is connected to the disengagement hydraulic chamber 13 via a port 40. An oil temperature sensor 61 for detecting an oil temperature in the oil passage 36 is further provided.

A solenoid valve 41 is provided to control the signal oil pressure supplied to the signal pressure port 35. The solenoid valve 41 includes an input port 42 and an output port 43, and the output port 43 is connected to the signal pressure port 35 via an oil passage 44. More specifically, the solenoid valve 41 is a duty solenoid valve that is alternately energized and de-energized and outputs a signal oil pressure corresponding to a ratio (duty ratio) between the energization and the de-energization from the output port 43. In this embodiment, the solenoid valve 41 outputs a high-pressure signal oil pressure or a low-pressure signal oil pressure. Note that the high pressure and low pressure of the signal oil pressure output from the solenoid valve 41 only serves to distinguish the relative relationship between signal oil pressures. Further, an oil passage 45 is connected to the input port 42, and a solenoid modulator valve 46 is provided to control the oil pressure in the oil passage 45. The solenoid modulator valve 46 includes an input port 47 connected to the oil passage 19 and an output port 48 connected to the oil passage 45. The solenoid modulator valve 46 modulates the oil pressure in the oil passage 19 and supplies the modulated oil pressure to the oil passage 45.

Furthermore, in this embodiment, an oil passage 49 is provided to supply a part of the oil in the oil passage 36 to the input port 42 of the solenoid valve 41. A temperature sensitive valve 50 is provided on a path extending from the oil passage 49 to the oil passage 45. A port of the temperature sensitive valve 50 is opened and closed in accordance with the oil temperature of the input port 42. More specifically, if an oil temperature Tsm of the input port 42 is below a predetermined oil temperature Tsm0, the port of the temperature sensitive valve 50 is opened, to thereby connect the oil passage 36 to the oil passage 45. If the oil temperature Tsm of the input port 42 equals or exceeds the predetermined oil temperature Tsm0, however, the port of the temperature sensitive valve 50 is closed, thereby blocking the oil passage 36 from the oil passage 45. An externally controlled solenoid valve in which a port is opened and closed by activating a valve body based on a signal from a sensor (not shown) that detects the oil temperature of the oil passage 45 or an automatically opening/closing valve that employs a temperature sensitive element that changes shape in accordance with the oil temperature, in which a port is opened and closed by activating a valve body (not shown) in accordance with the deformation of the temperature sensitive element, may be used as the temperature sensitive valve 50. The automatic opening/closing valve uses a shape memory polymer or a shape memory alloy as the temperature sensitive element. A nickel-titanium alloy or a copper-zinc-aluminum alloy, for example, may be used as the shape memory alloy. A styrene-butadiene copolymer or a polyisoprene system may be used as the shape memory polymer.

Further, a directional control valve 51 is provided in the oil passage 23 and the oil passage 38. The directional control valve 51 switches a supply destination of the oil in the oil passage 38 selectively. The directional control valve 51 includes an input port 52, output ports 53, 54, and a signal pressure port 55. The input port 52 is connected to the oil passage 38, the output port 53 is connected to the oil passage 23, and the output port 54 is connected to an oil passage 56. Further, a solenoid valve 63 is connected to the signal pressure port 55 via an oil passage 57. The solenoid valve 63 outputs a signal oil pressure corresponding to a current value to the oil passage 57. In this embodiment, a high-pressure signal oil pressure and a low-pressure signal oil pressure may be output from the solenoid valve 63, and the directional control valve 51 is constituted such that the input port 52 is connected to the output port 53 or the output port 54 selectively based on the signal oil pressure input into the signal pressure port 55.

Note that the high pressure and low pressure of the signal oil pressure output from the solenoid valve 63 only serves to distinguish the relative relationship between signal oil pressures. For example, if the signal oil pressure of the solenoid valve 63 is high, the input port 52 may be connected to the output port 53 and the output port 54 may be closed, and when the signal oil pressure of the solenoid valve 63 is low, the input port 52 may be connected to the output port 54 and the output port 53 may be closed. Conversely, if the signal oil pressure of the solenoid valve 63 is low, the input port 52 may be connected to the output port 53 and the output port 54 may be closed, and if the signal oil pressure of the solenoid valve 63 is high, the input port 52 may be connected to the output port 54 and the output port 53 may be closed.

A cooler 57 is provided in the oil passage 56 such that some of the oil supplied to the oil passage 56 is cooled by the cooler 57 and then returned to the oil pan 17. Further, another oil passage 58, which bifurcates from the oil passage 56 between the cooler 57 and the output port 54, is provided, and oil supplied to the oil passage 58 is supplied to a lubricating system 59. The lubricating system 59 is an oil passage that supplies oil to a heat generating portion, a sliding portion, and so on of the transmission 4 to cool and lubricate these portions. Meanwhile, the transmission 4 is a power transmission apparatus that modifies the ratio between an input rotational speed and an output rotational speed. A stepped transmission or a continuously variable transmission may be used as the transmission 4. A stepped transmission is a transmission which is capable of modifying a gear ratio in a stepped fashion, or in other words discontinuously, and a planetary gear transmission, a selective gear transmission, a constant mesh transmission, and so on may be used as the stepped transmission. A continuously variable transmission, on the other hand, is a transmission which is capable of modifying the gear ratio in a non-stepped fashion, or in other words continuously, and a toroidal type continuously variable transmission, a belt type continuously variable transmission, and so on may be used as the continuously variable transmission. Note that if the transmission 4 is a continuously variable transmission, a forward-reverse switching apparatus (not shown) is provided to switch a rotation direction of a rotary element between forward and reverse. Regardless of the type of transmission used as the transmission 4, the gear ratio of the transmission 4 is controlled by a hydraulic actuator. Further, if a forward-reverse switching apparatus is provided, a hydraulically controlled forward-reverse switching mechanism may be employed.

Next, the control system of the vehicle 1 will be described. An electronic control apparatus 60 is provided, and the electronic control apparatus 60 stores data and a map for controlling an engine output, data and a map for controlling the gear ratio of the transmission 4, and a basic map and data for controlling engagement of the lockup clutch 11. Further, when the port of the temperature sensitive valve 50 is opened and closed in accordance with an external signal, data for opening and closing the port of the temperature sensitive valve 50 based on the oil temperature are stored in the electronic control apparatus 60. Signals from various sensors and switches are input into the electronic control apparatus 60, whereby the electronic control apparatus 60 detects an engine speed and an engine torque, the input rotational speed and output rotational speed of the transmission 4, a vehicle speed, an acceleration request, a deceleration request, the oil temperature of the input port 42, the oil temperature of the oil passage 36, and so on. Meanwhile, the electronic control apparatus 60 outputs a signal that controls the output of the engine 2, a signal that controls the signal oil pressure output from the solenoid valves 41, 63, a signal that controls the pressure control characteristics of the pressure control valves 21, 25, and a signal for controlling the gear ratio of the transmission 4. Further, if the temperature sensitive valve 50 is constituted such that the port is opened and closed in accordance with an external signal, the temperature sensitive valve 50 is controlled by a signal from the electronic control apparatus 60.

In the vehicle 1 constituted in the manner described above, torque output from the engine 2 is transmitted to the vehicle wheel 6 via the torque converter 3, the transmission 4, and the final reduction gear 5, whereby driving force is generated. Next, actions of the hydraulic control apparatus 14 and control of the lockup clutch 11 will be described. When the oil pump 15 is driven, the oil in the oil pan 17 is drawn by the oil pump 15 and ejected into the oil passage 19. The oil pressure of the oil passage 19 is controlled by the pressure control valve 21, and the oil in the oil passage 19 is supplied to the pressurized oil requiring portion 20. Once the oil has been discharged from the oil passage 19 into the oil passage 23 through the pressure control valve 21, the oil pressure Psec of the oil passage 23 is controlled by the pressure control valve 25.

The basic map for controlling engagement of the lockup clutch 11 is stored in the electronic control apparatus 60. The basic map is divided into a region for engaging the lockup clutch 11 and a region for disengaging the lockup clutch 11 based on the vehicle speed and an accelerator depression amount (acceleration request), for example. If a condition for disengaging the lockup clutch 11 is established according to the basic map for controlling the lockup clutch 11, the signal oil pressure output from the solenoid valve 41 is controlled to a low pressure. As a result, the spool 27 of the switching valve 26 is pushed by the spring 28 toward an upper side in FIG. 1, whereby the switching valve 26 enters an OFF state, which is shown on the left side of a center line in FIG. 1. When the switching valve 26 is controlled to the OFF state, the input port 29 is closed, the input port 30 is connected to the output port 32, the output port 31 is connected to the drain port 33, and the drain port 34 is thereby closed.

When the switching valve 26 is controlled to the OFF state in this manner, the oil in the oil passage 23 is supplied to the oil passage 37 through the input port 30 and the output port 32. Further, the oil in the oil passage 37 is supplied to the disengagement hydraulic chamber 13 in the casing 7, causing the oil pressure of the disengagement hydraulic chamber 13 to rise. Furthermore, when the switching valve 26 is controlled to the OFF state, the oil in the engagement hydraulic chamber 12 is discharged to the oil passage 38 through the oil passage 36, the output port 31, and the drain port 33. As a result, the oil pressure of the engagement hydraulic chamber 12 falls. When the oil pressure of the disengagement hydraulic chamber 13 rises above the oil pressure of the engagement hydraulic chamber 12, the piston forming the lockup clutch 11 operates in the direction of the axis such that the friction material separates from the front cover of the easing 7. In other words, the lockup clutch 11 is disengaged. When the lockup clutch 11 is disengaged in this manner, power is transmitted between the pump impeller 8 and the turbine runner 9 using the kinetic energy of the working oil. Further, when the speed ratio between the pump impeller 8 and the turbine runner 9 is within a predetermined range, or more specifically within the range of a predetermined value smaller than 1, torque amplification is performed by the torque converter 3 in accordance with an operation of the stator 62.

In addition, when the lockup clutch 11 is disengaged, slippage occurs between the pump impeller 8 and the turbine runner 9, causing the oil in the casing 7 to be agitated such that the oil temperature rises. Taking into consideration the fact that the lockup clutch 11 is engaged based on the basic map for controlling engagement of the lockup clutch 11, the viscosity of the working oil is preferably relatively low, or in other words the oil temperature preferably exceeds a predetermined temperature, to ensure that the piston to which the friction material is attached operates smoothly. Hence, in this embodiment, the temperature (oil temperature) of the oil that passes through the interior of the casing 7 of the torque converter 3 is detected by the oil temperature sensor 61 such that if the oil temperature in the casing 7 is equal to or below a predetermined temperature, a control to increase the oil temperature in the torque converter 3, in other words a warming control, is executed. The predetermined oil temperature that serves as a threshold for executing the warming control is stored in the electronic control apparatus 60. Further, the predetermined oil temperature is set at a value determined through experiment or simulation.

In the warming control, the signal oil pressure of the solenoid valve 63 is controlled such that the input port 52 of the directional control valve 51 is connected to the output port 53 and the output port 54 is closed. When the directional control valve 51 is controlled in this manner, the oil that is discharged from the interior of the casing 7 to the oil passage 38 through the oil passage 36 is returned to the oil passage 23 via the directional control valve 51, as noted above. The oil returned to the oil passage 23 is then supplied to the disengagement hydraulic chamber 13 through the oil passage 37 in a similar manner to that described above. Hence, a closed circulation circuit is formed by the casing 7, the oil passages 64, 37, 38, the switching valve 26, and the directional control valve 51, and increasing the oil temperature in the casing 7 is promoted by enclosing oil in this circulation circuit.

When the oil temperature in the casing 7 reaches or exceeds the predetermined temperature, the lockup clutch 11 may be engaged, and therefore the warming control is terminated. Note that the meaning of the phrase "the lockup clutch 11 may be engaged" will be described below. Upon termination of the warming control, the signal oil pressure output from the solenoid valve 63 is controlled such that in the directional control valve 51, the input port 52 is connected to the output port 54 and the output port 53 is closed. As a result, the oil that is discharged from the casing 7 to the oil passage 38 through the oil passage 36 is supplied to the oil passage 56 via the directional control valve 51. Some of the oil in the oil passage 56 is supplied to the lubrication system 59, and some of the oil in the oil passage 56 is cooled by the cooler 57 and returned to the oil pan 17.

However, if it is determined in accordance with the basic map for controlling engagement of the lockup clutch 11 that a condition for engaging the lockup clutch 11 has been established, the signal oil pressure output from the solenoid valve 41 is controlled to a high pressure. If the signal oil pressure input into the signal pressure port of the switching valve 26 is controlled to a high pressure in this manner, the spool 27 of the switching valve 26 operates downward against a spring force of the spring 28, as shown on the right side of the center line in FIG. 1. As a result, the input port 29 is connected to the output port 31, the input port 30 is closed, the output port 33 is closed, and the output port 32 is connected to the drain port 34. When the switching valve 26 is thus controlled, the oil in the oil passage 23 is supplied to the engagement hydraulic chamber 12 through the oil passage 36, whereby the oil pressure in the engagement hydraulic chamber 12 rises. Further, the oil in the disengagement hydraulic chamber 13 is discharged to the oil passage 56 through the oil passage 37 and the oil passage 38, whereby the oil pressure in the disengagement hydraulic chamber 13 falls. By controlling the oil pressure of the engagement hydraulic chamber 12 and the oil pressure of the disengagement hydraulic chamber 13 in this manner, the lockup clutch 11 is engaged. In other words, power is transmitted between the engine 2 and the transmission 4 through frictional force.

When the lockup clutch 11 is engaged, the oil temperature in the casing 7 rises to a value that exceeds the predetermined temperature due to the warming control described above, and therefore the piston forming the lockup clutch 11 operates smoothly, enabling suppression of a shock that accompanies engagement of the lockup clutch 11. As a result, drivability is improved. The phrase "the lockup clutch 11 may be engaged" includes a technical meaning according to which the lockup clutch 11 may be engaged without generating a shock. Further, because the oil temperature in the casing 7 is raised forcefully, it is possible to achieve a relative enlargement of an operating region over which the lockup clutch 11 may be engaged, leading to improved fuel efficiency of the engine 2. Note that when the lockup clutch 11 is engaged, or more specifically completely engaged, the pump impeller 8 and the turbine runner 9 rotate integrally, but by controlling the oil pressure of the oil passage 23 using the pressure control valve 25 such that the oil pressure of the oil supplied to the engagement hydraulic chamber 12 is relatively low, the lockup clutch 11 can be set in a slip (half-engaged) state.

In this embodiment, activation of the spool 27 of the switching valve 26 is controlled in accordance with a signal oil pressure Pdsu output by the solenoid valve 41, and therefore, if the responsiveness of the signal oil pressure Pdsu output from the solenoid valve 41 decreases, the responsiveness of the piston during engagement of the lockup clutch 11 decreases, and as a result, vibration may occur. In the first embodiment in particular, the switching valve 26 is controlled to an ON state when the signal oil pressure of the solenoid valve 41 is controlled to a high pressure. It is therefore possible in this embodiment to execute the control for increasing the responsiveness of the signal oil pressure Pdsu of the solenoid valve 41. More specifically, if the oil temperature Tsm of the oil passage 45 for generating an oil pressure Psm in the input port 42 is below the predetermined oil temperature Tsm0 when the lockup clutch 11 is disengaged, the port of the temperature sensitive valve 50 is opened, and if the oil temperature Tsm equals or exceeds the predetermined oil temperature Tsm0, the port of the temperature sensitive valve 50 is closed.

Hence, if the oil temperature Tsm is below the predetermined oil temperature Tsm0, a portion of the oil discharged from the casing 7 into the oil passage 36 may be passed through the oil passage 49 to converge with the oil passage 45. In other words, the thermal energy of the oil in the oil passage 49 may be transferred to the oil in the input port 42 to increase the oil temperature Tsm of the oil. Here, the control for supplying the oil in the oil passage 36 to the oil passage 45 by opening the port of the temperature sensitive valve 50 may be executed either during or after the warming control described above. Note that if the port of the temperature sensitive valve 50 is closed, the oil in the oil passage 36 is no longer supplied to the oil passage 45. Hence, if the oil temperature Tsm in the input port 42 of the solenoid valve 41 is below the predetermined oil temperature Tsm0, the oil in the oil passage 36 may be supplied to the input port 42 of the solenoid valve 41. As a result, the responsiveness of the signal oil pressure output from the output port 43 of the solenoid valve 41 may be improved, and the lockup clutch 11 may be engaged smoothly. Furthermore, by adding the temperature sensitive valve 50, the oil in the oil passage 36 may be supplied to the input port 42, and therefore increases in the number of components and the space for arranging components can be decreased, thereby avoiding cost increases.

The engine 2 is an example of a power source according to the invention, the casing 7 serves as an example of a casing according to the invention, the pump impeller serves as an example of a first rotary member according to the invention, the turbine runner 9 and input shaft 10 serve as an example of a second rotary member according to the invention, the torque converter 3 serves as an example of a fluid transmission apparatus according to the invention, the lockup clutch 11 serves as an example of a clutch according to the invention, the switching valve 26 serves as an example of a clutch switching mechanism according to the invention, the solenoid valve 41 serves as an example of a control oil pressure generation apparatus according to the invention, the predetermined temperature Tpm0 serves as an example of a predetermined temperature according to the invention, the oil passage 49 and the temperature sensitive valve 50 serve as an example of a switching apparatus according to the invention, the oil passage 49 serves as an example of an oil passage according to the invention, and the signal oil pressure input into the signal pressure port 35 serves as an example of a control oil pressure according to the invention.

Figure 3:
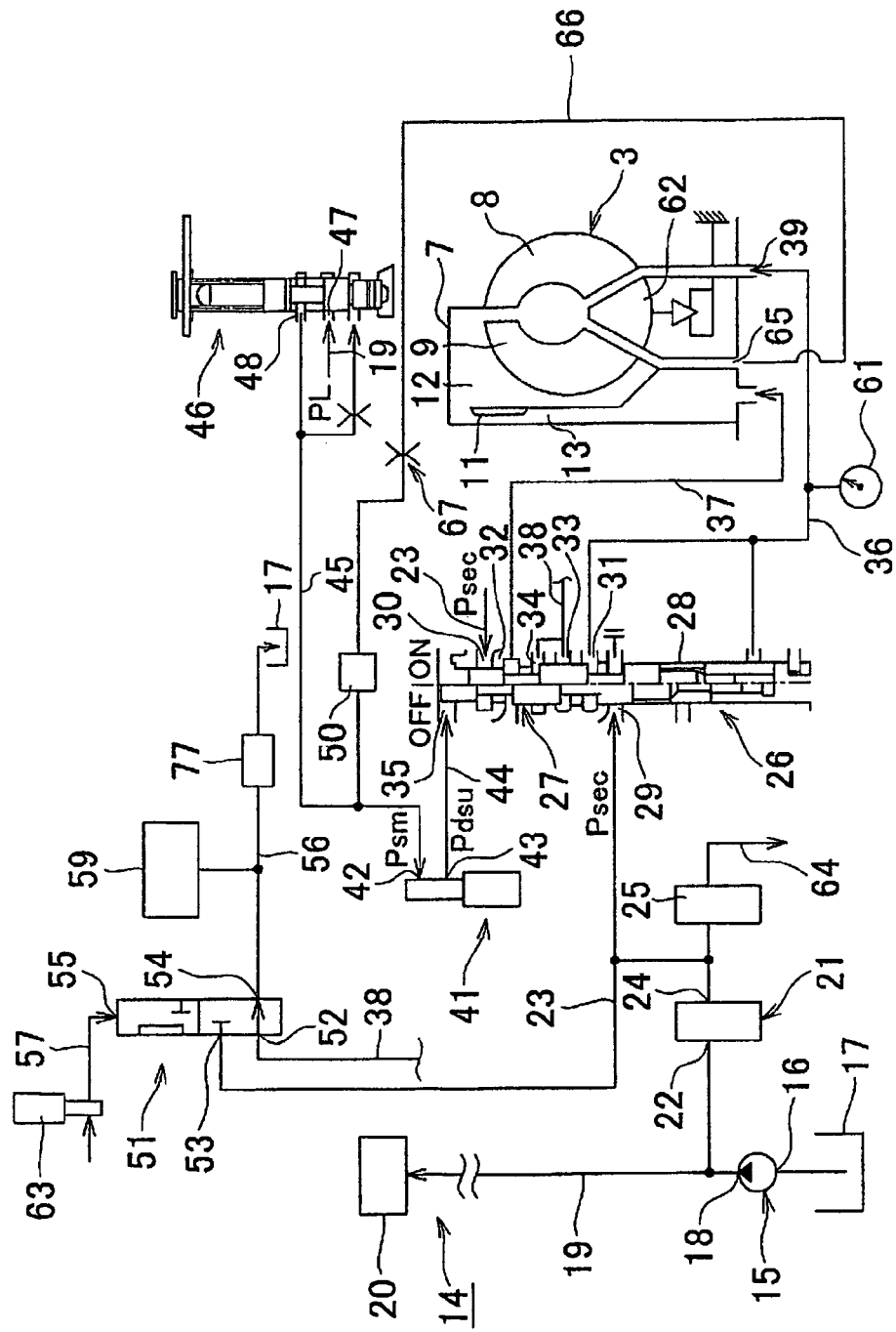
FIG. 3 is a schematic diagram showing a hydraulic control apparatus according to a second embodiment of the invention.

Next, a second embodiment of the invention will be described with reference to FIG. 3. In FIG. 3, constituent parts identical to those shown in FIG. 1 are designated using identical reference symbols. In the second embodiment, a port 65 connected between the pump impeller 8 and the turbine runner 9 is provided in the casing 7, and the port 65 is connected to the oil passage 45 by an oil passage 66. The temperature sensitive valve 50 is provided on a path that extends from the oil passage 66 to the oil passage 45. The constitution and functions of the temperature sensitive valve 50 are identical to those of the temperature sensitive valve 50 shown in FIG. 1. Further, a throttle portion 67 is provided in the oil passage 66. The throttle portion 67 is used to narrow the sectional area of the oil passage 66, and may be constituted by either an orifice or a choke.

In the second embodiment, parts having an identical constitution to their counterparts in the first embodiment exhibit identical actions and effects to the first embodiment. In addition, if the lockup clutch 11 remains engaged over a long time period, the oil temperature of the oil passage 45 may decrease. If the lockup clutch 11 is disengaged thereafter and the condition for engaging the lockup clutch 11 is subsequently re-established, the responsiveness of the signal oil pressure output from the solenoid valve 41 may decrease. In the second embodiment, however, opening/closing of the port of the temperature sensitive valve 50 is controlled when the lockup clutch 11 is engaged such that the oil in the casing 7 may be supplied to the input port 42. The conditions for opening the port of the temperature sensitive valve 50 are identical to those of the first embodiment, and when the port of the temperature sensitive valve 50 is opened, some of the oil in the casing 7 is supplied to the oil passage 45 through the port 65 and the oil passage 66. Hence, when the lockup clutch 11 is engaged, thermal energy can be applied to the oil in the input port 42, thereby increasing the oil temperature Tsm, and as a result, effects similar to the first embodiment may be obtained even if engagement of the lockup clutch 11 is repeated frequently.

Further, when the oil in the oil passage 45 is used to lubricate a frictional engagement apparatus, such as a clutch or a brake, for controlling the gear ratio of the transmission 4 or a frictional engagement apparatus of a forward-reverse switching apparatus, reductions in the viscosity of the oil used to lubricate the frictional engagement apparatus may be suppressed. Accordingly, dragging of the disengaged frictional engagement apparatus is avoided, thereby preventing a reduction in power transmission efficiency. Furthermore, in the second embodiment, the orifice 67 is provided in the oil passage 66, and therefore a situation in which a large amount of oil flows out of the casing 7 into the oil passage 45 is prevented. In the second embodiment, the oil passage 66 is included in the switching apparatus according to the invention. All other constituents of the second embodiment are identical to their counterparts in the first embodiment.

Figure 4:
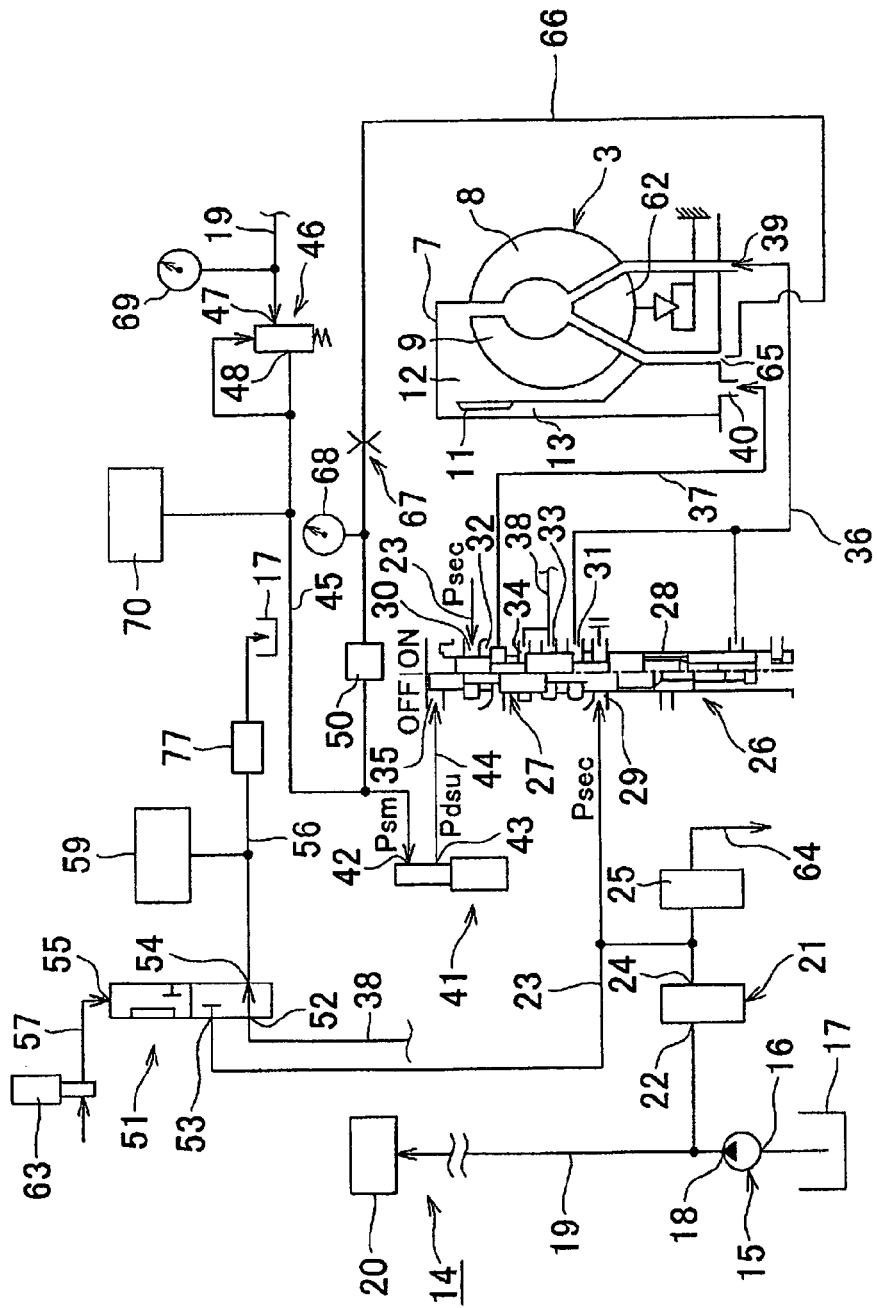
FIG. 4 is a schematic diagram showing a hydraulic control apparatus according to a third embodiment of the invention.

Next, a third embodiment of the hydraulic control apparatus 14 according to the invention will be described with reference to FIG. 4. In FIG. 4, constituent parts identical to those shown in FIGS. 1 and 3 are designated using identical reference symbols. In FIG. 4, an oil temperature sensor for detecting the oil temperature of the oil passage 36 is not provided. Further, in the third embodiment, similar to the second embodiment, the oil passage 66 is provided and the temperature sensitive valve 50 is provided on the path extending from the oil passage 66 to the oil passage 45. Additionally, in the third embodiment, an oil temperature sensor 68 is provided in the oil passage 67 to detect the oil temperature between the throttle portion 67 and the temperature sensitive valve 50. An oil temperature sensor 69 is also provided to detect the oil temperature in a valve body incorporating the hydraulic control apparatus 14, for example the oil temperature of the oil passage 19. In addition, some of the oil in the oil passage 45 is supplied to an electromagnetic control valve 70. The electromagnetic control valve 70 includes a linear solenoid valve and a duty solenoid valve. Signals from the oil temperature sensors 68, 69 are input into the electronic control apparatus 60. Further, a current value of power supplied to the electromagnetic control valve 70 is controlled by the electronic control apparatus 60. By controlling the current value, an oil pressure modulation characteristic of the electromagnetic control valve 70 is modified. In other words, the pressure modulation characteristic of the electromagnetic control valve 70 varies in accordance with the current supplied, as well as the oil temperature. More specifically, as the oil temperature decreases, leading to an increase in viscosity, the pressure modulation responsiveness decreases.

In the third embodiment, parts having an identical constitution to their counterparts in the first and second embodiments exhibit identical actions and effects to the first and second embodiments. In addition, in the third embodiment, the control shown in FIG. 5 may be executed when the lockup clutch 11 is disengaged. First, a determination is made as to whether the oil temperature Tho detected by the oil temperature sensor 69 exceeds the predetermined oil temperature Tsm0 (step S1). If an affirmative determination is made in step S1, engagement of the lockup clutch 11 is permitted based on the basic map, which is based on the vehicle speed and the accelerator depression amount (step S2), whereupon the routine returns to step S1.

If a negative determination is made in step S2, however, it is then determined whether the oil temperature Ttc detected by the oil temperature sensor 68 is below the predetermined oil temperature Tsm0 (step S3). If an affirmative determination is made in step S3, the port of the temperature sensitive valve 50 is opened, whereby the oil in the casing 7 is supplied to the input port 42 of the solenoid valve 41 to warm the oil in the input port 42. If an affirmative determination is made in step S3, it is then determined whether a rate of change dTtc/dt in the oil temperature of the oil passage 66 exceeds a predetermined value dTtc0/dt (step S4). Step S4 is used to determine whether the temperature sensitive valve 50 is normal, and an affirmative determination in step S4 indicates that the port of the temperature sensitive valve 50 has been securely opened. Accordingly, the warming control described above is executed (step S5), whereupon the routine returns to step S1.

Figure 6:
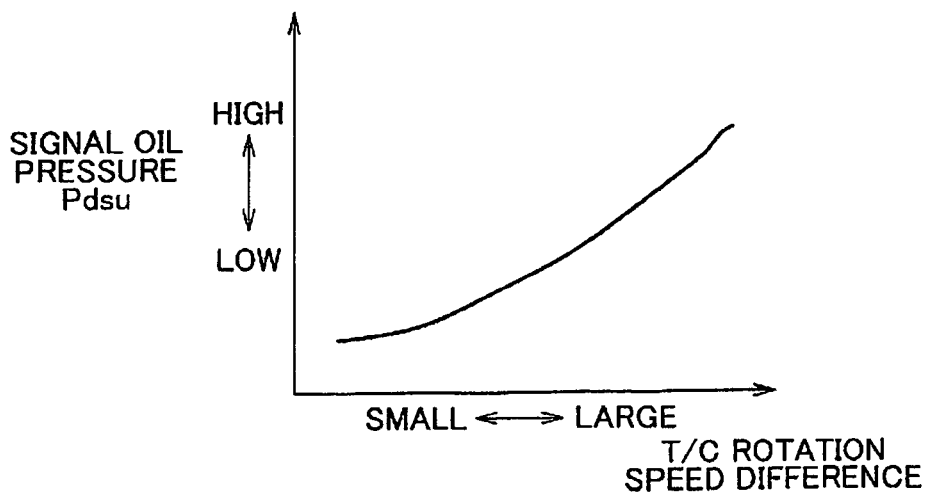
FIG. 6 is an example of a map used in the control of FIG. 5.

In step S5, the signal oil pressure Pdsu of the solenoid valve 41 is controlled via the switching valve 26 so that the amount of oil circulating through the closed circulation circuit reaches a value based on the rotational speed difference between the pump impeller 8 and the turbine runner 9. FIG. 6 shows an example of a map used in the process of step S5. In the map shown in FIG. 6, the abscissa shows the rotational speed difference (T/C rotational speed difference) between the pump impeller 8 and the turbine runner 9, and the ordinate shows the signal oil pressure Pdsu of the solenoid valve 41. More specifically, the map illustrates a line segment having a characteristic according to which the signal oil pressure Pdsu of the solenoid valve 41 increases in proportion with increases in the rotational speed difference between the pump impeller 8 and the turbine runner 9. If the signal oil pressure Pdsu of the solenoid valve 41 is controlled in accordance with the map shown in FIG. 6, the spool 27 may be operated such that the switching valve 26 is set in an intermediate state between the ON state and the OFF state, in addition to the ON state and the OFF state. By controlling the spool 27 in this manner, the amount of oil discharged from the casing 7 into the oil passage 38 may be controlled linearly. More specifically, as the signal oil pressure Pdsu of the solenoid valve 41 increases, the opening area of the output port 33 decreases, leading to a reduction in the amount of circulating oil.

However, a negative determination in step S4 indicates that the port has not been opened due to failure of the temperature sensitive valve 50, and therefore that the oil temperature of the oil passage 66 has not decreased. Hence, if a negative determination is made in step S4, execution of warming control is prohibited (step S6), and the routine returns to step S1. The reason for this is to avoid a situation in which the warming control is executed, causing the interior of the torque converter 3 to overheat.

Figure 7:
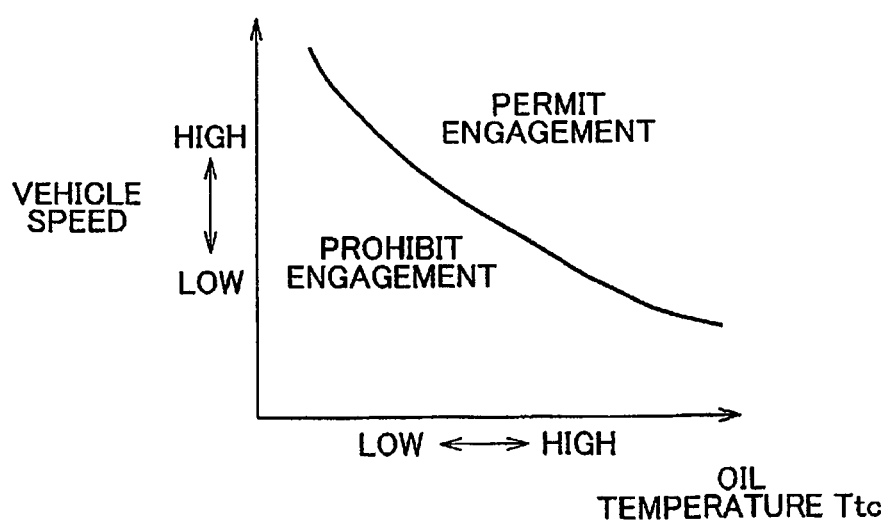
FIG. 7 is an example of another map used in the control of FIG. 5.

Meanwhile, a negative determination in step S3 means that the port of the temperature sensitive valve 50 has been closed. Hence, if a negative determination is made in step S3, a condition whereby engagement of the lockup clutch 11 is controlled based on the oil temperature Ttc detected by the oil temperature sensor 68 is added to the basic map described above as a condition for controlling engagement of the lockup clutch 11 (step S7), whereupon the routine returns to step S1. An example of the condition added in step S7 will now be described based on a correction map shown in FIG. 7. In the correction map shown in FIG. 7, the abscissa shows the oil temperature Ttc and the ordinate shows the vehicle speed. A line segment shown on the map serves as the boundary that separates a region in which engagement of the lockup clutch 11 is permitted and a region in which engagement of the lockup clutch 11 is prohibited. The line segment indicating the boundary has a characteristic whereby the vehicle speed decreases in proportion to increases in the oil temperature Ttc. At a vehicle speed on or above the line segment, engagement of the lockup clutch 11 is permitted, and at a vehicle speed below the line segment, engagement of the lockup clutch 11 is prohibited. In other words, according to the correction map shown in FIG. 7, the region over which engagement of the lockup clutch 11 is permitted increases as the vehicle speed increases. The reason for this is that as the vehicle speed increases, the torque that is input into the torque converter 3 from the engine 2 decreases, leading to a relative reduction in the shock that occurs when the lockup clutch 11 is engaged. When engagement of the lockup clutch 11 is controlled using the basic map in this manner, the vehicle speed determined according to the correction map shown in FIG. 7 may be replaced by the vehicle speed of the basic map to control engagement of the lockup clutch 11.

Figure 5:
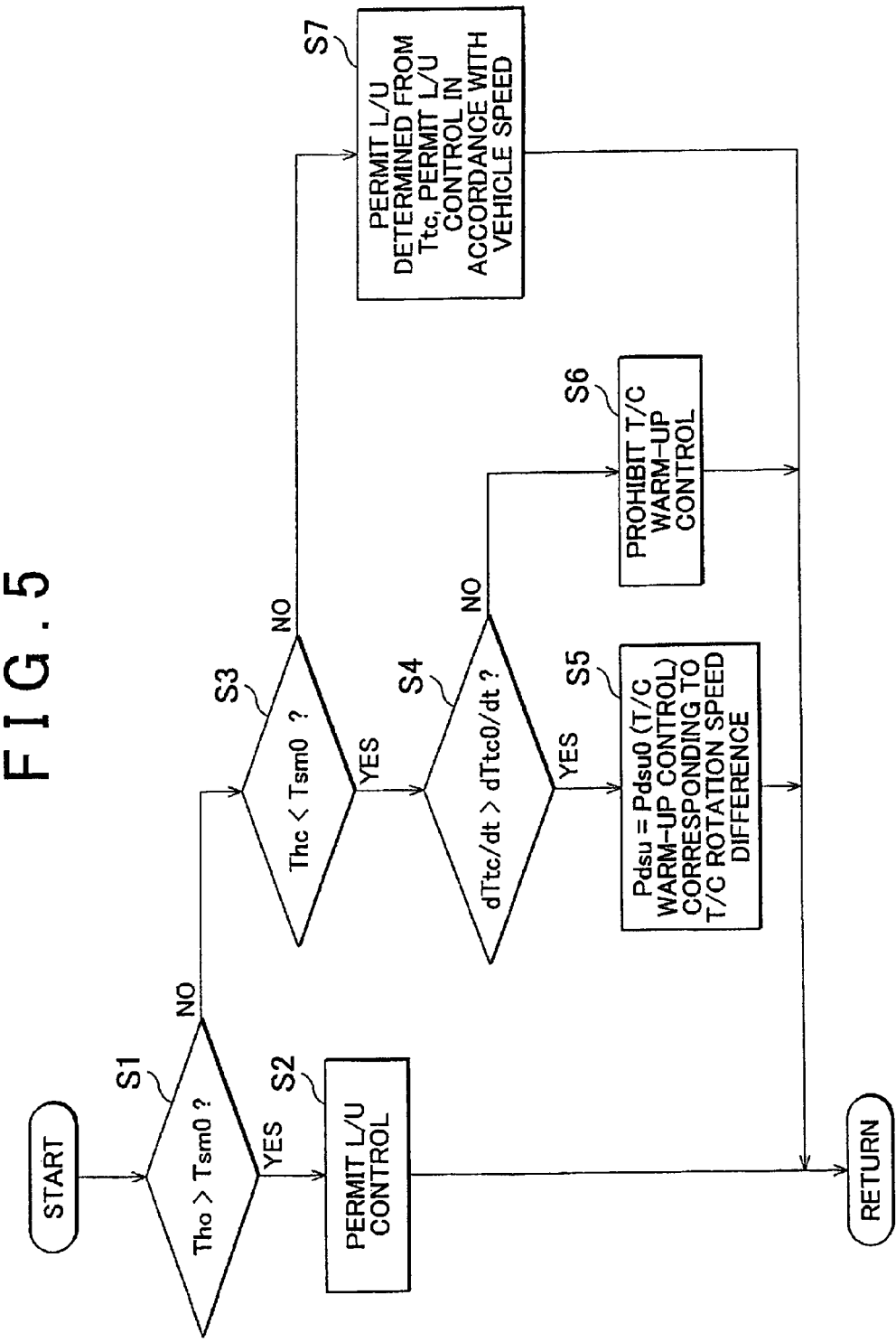
FIG. 5 is a flowchart showing an example of control that is executed by the hydraulic control apparatus according to the third embodiment.

Hence, in the third embodiment, if a negative determination is made in step S1, an affirmative determination is made in step S3, and an affirmative determination is made in step S4, the warming control is executed preferentially, and if an affirmative determination is made in step S1 or a negative determination is made in step S3 thereafter, engagement of the lockup clutch 11 is permitted. As a result, the warming control may be executed more reliably. Further, if the control shown in FIG. 5 is executed, an operation defect in the temperature sensitive valve 50 may be determined. Note that the signal from the oil temperature sensor 69 may be used to control the pressure modulation characteristic of the electromagnetic control valve 70.

To describe the apparatuses shown in FIG. 5 in terms of functions, step S3 is an example of a function of a condition determination apparatus according to the invention, step S5 is an example of a function of an execution apparatus according to the invention, and step S6 serves as an example of a function of a prohibition apparatus according to the invention. Further, the oil passages 23, 36, 37, 38, the switching valve 26, the directional control valve 51, and the solenoid valves 41, 63 are examples of a warming apparatus according to the invention, and the temperature sensitive valve 50 is an example of a valve according to the invention. All other constituents of the third embodiment are identical to their counterparts of the first and second embodiments.

Figure 8:
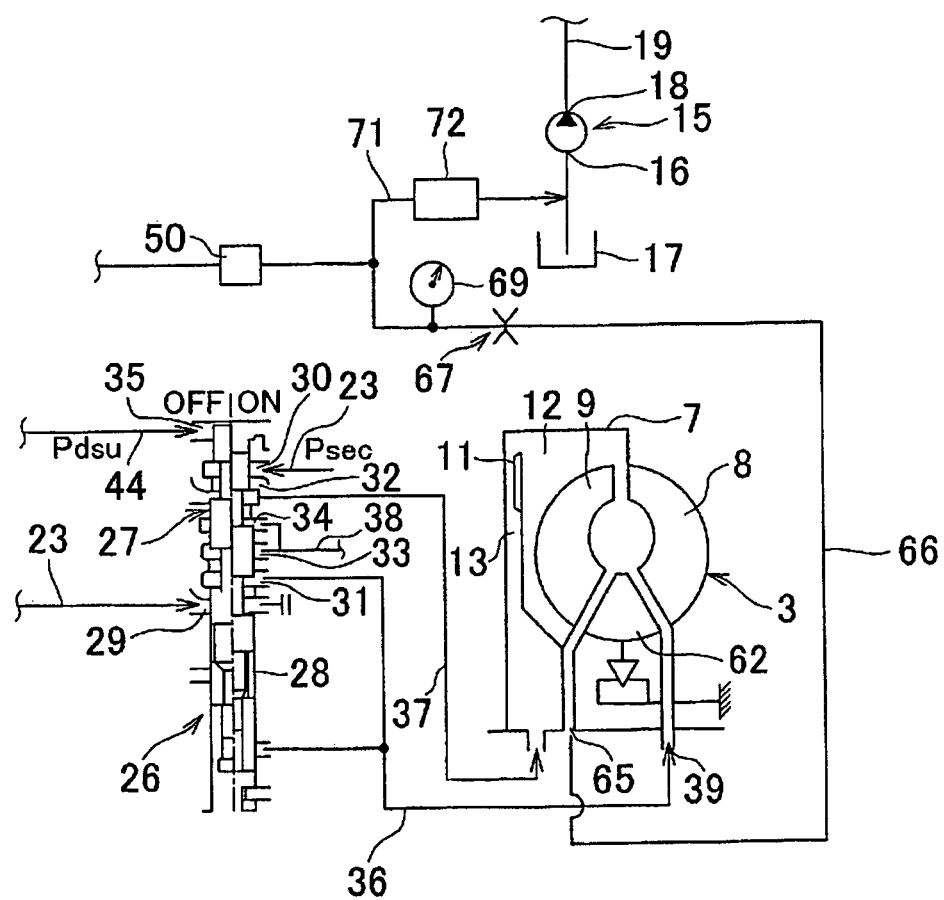
FIG. 8 is a partial schematic diagram showing a hydraulic control apparatus according to a fourth embodiment of the invention.

Next, a fourth embodiment of the hydraulic control apparatus 14 will be described with reference to FIG. 8. The fourth embodiment is used in combination with the hydraulic control apparatus 14 shown in FIG. 3 or the hydraulic control apparatus 14 shown in FIG. 4, rather than independently. FIG. 8 shows a part of the hydraulic control apparatus 14. The parts thereof omitted from FIG. 8 may be shared with FIG. 3 or FIG. 4. The hydraulic control apparatus 14 shown in FIG. 8 is provided with another oil passage 71 that bifurcates from the oil passage 66 between the throttle portion 67 and the temperature sensitive valve 50. The other oil passage 71 is connected to the suction port 16 of the oil pump 15. Further, a temperature sensitive valve 72 is provided in the oil passage 71. The temperature sensitive valve 72 is constituted similarly to the temperature sensitive valve 50 such that a port thereof is opened based on an oil temperature. More specifically, the temperature sensitive valve 72 has a constitution and a function whereby the port is opened when the oil temperature Tsuc of oil drawn into the suction port 16 from the oil pan 17 is below a predetermined temperature Tsuc0 and the port is closed if the oil temperature Tsuc equals or exceeds the predetermined temperature Tsuc0.

In the hydraulic control apparatus 14 shown in FIG. 8, constituent parts identical to the hydraulic control apparatus 14 shown in FIG. 3 or the hydraulic control apparatus 14 shown in FIG. 4 exhibit identical actions and effects to the hydraulic control apparatus 14 shown in FIG. 3 or the hydraulic control apparatus 14 shown in FIG. 4. Furthermore, in the hydraulic control apparatus 14 shown in FIG. 8, the oil in the oil passage 66 is not drawn into the oil pump 15 when the port of the temperature sensitive valve 72 is closed. When the oil pump 15 is driven and the port of the temperature sensitive valve 72 is opened, on the other hand, some the oil stored in the interior of the casing 7 is drawn into the oil pump 15 through the oil passage 66 and the oil passage 71. Thus, the oil temperature of the oil that is ejected into the oil passage 19 from the oil pump 15 may be raised, whereby the entire valve body may be warmed. Furthermore, if the oil temperature of the oil drawn into the oil pump 15 is relatively high, the viscosity of the oil decreases, leading to a relative reduction in the torque required to drive the oil pump 15.

Hence, when the oil pump 15 is driven by the engine 2, the fuel efficiency of the engine 2 may be improved. Further, the torque required to drive the oil pump 15 may be reduced, and therefore the occurrence of cavitation in the suction port 16 can be avoided. Moreover, in the fourth embodiment, the oil ejected into the oil passage 19 is reduced in pressure by various electromagnetic control valves so that when the hydraulic energy thereof is converted into thermal energy, the oil obtains a greater quantity of heat, then the warming range of the valve body may be expanded. Furthermore, the responsiveness of the hydraulic actuator of the transmission 4, which is included in the pressurized oil requiring portion 20, improves. The oil passage 71 serves as an example of a return oil passage according to the invention. All other constituents of the fourth embodiment are identical to their counterparts of the first to third embodiments.

Next, an example of control that may be executed by the hydraulic control apparatus 14 shown in FIG. 4 when combined with the constitution shown in FIG. 8 will be described based on the flowchart shown in FIG. 9. It is assumed in the flowchart of FIG. 9 that the temperature sensitive valve 72 is constituted such that the port is opened when the oil temperature Tho of the oil passage 66 is equal to or below a predetermined temperature Tho0 and the port is closed when the oil temperature Tho of the oil passage 66 exceeds the predetermined temperature Tho0. First, a determination is made as to whether the oil temperature Tho detected by the oil temperature sensor 69 exceeds the predetermined oil temperature Tho0 (step S11). The predetermined oil temperature Tho0 may be determined through experiment or simulation, and is stored in the electronic control apparatus 60. If an affirmative determination is made in step S11, the port of the temperature sensitive valve 72 is closed and the routine returns to step S1. The process of step S2 is identical to the process of step S2 shown in FIG. 5. If the routine advances to step S2 in this manner, the oil in the oil passage 66 is not returned to the oil pump 15. Further, if the routine advances to step S2, the warming control is not executed.

Figure 10:
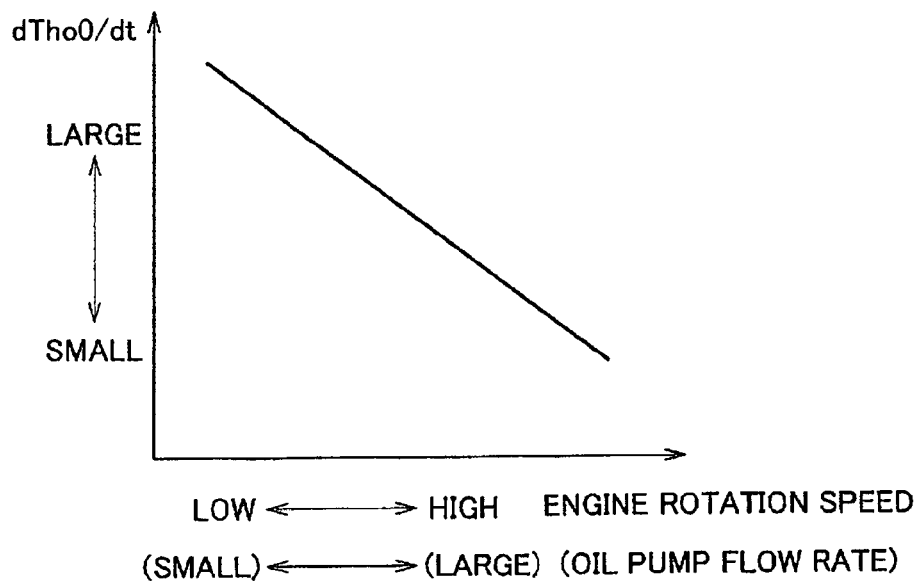
FIG. 10 is an example of a map used in the flowchart of FIG. 9.

If a negative determination is made in step S11, the port of the temperature sensitive valve 72 is opened and the process of step S5 is performed. The process of step S5 is identical to the process of step S5 shown in FIG. 5. Following step S5, a determination is made as to whether the rate of change dTho/dt in the oil temperature Tho exceeds a predetermined rate of change dTho0/dt (step S12). Here, the predetermined rate of change dTho0/dt may be determined using maps shown in FIGS. 10 and 11, for example. In the map shown in FIG. 10, the abscissa shows the engine speed or an ejection amount of the oil pump 15, and the ordinate shows the predetermined rate of change dTho0/dt. The map of FIG. 10 illustrates that as the engine speed increases or as the ejection amount of the oil pump 15 increases, the predetermined rate of change dTho0/dt tends to decrease. The tendency is determined based on the fact that because the oil ejected from the oil pump 15 is cooled by the cooler 57 and returned to the oil pan 17, the temperature increase rate of the oil decreases as the ejection amount of the oil pump 15 increases.

Figure 11:
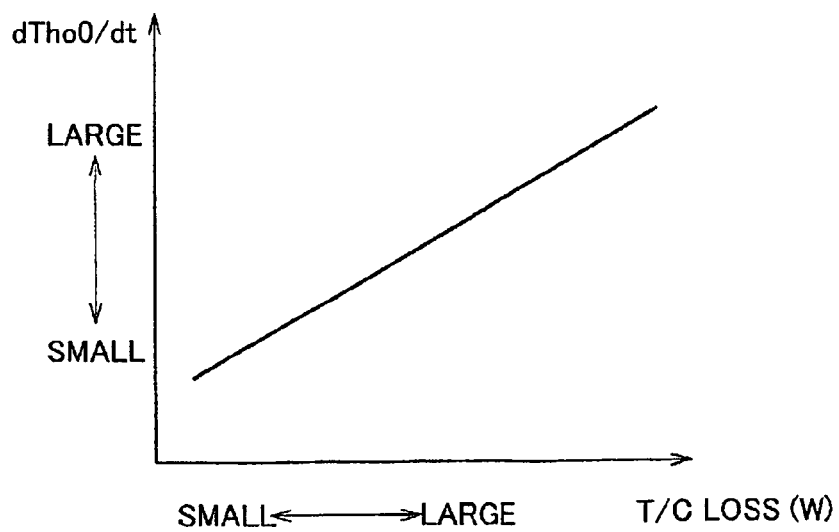
FIG. 11 is another example of a map used in the flowchart of FIG. 9.

Meanwhile, in the map of FIG. 11, the abscissa shows power loss (T/C loss) in the torque converter 3. The power loss in the torque converter 3 may be determined based on the ratio (speed ratio) between the rotational speed of the pump impeller 8 and the rotational speed of the turbine runner 9, and the relationship between the speed ratio and the power loss is stored as a map in the electronic control apparatus 60. In the map of FIG. 11, the predetermined rate of change dTho0/dt tends to increase as the power loss of the torque converter 3 increases. The tendency is determined by taking into account the fact that as the rotational speed difference between the pump impeller 8 and the turbine runner 9 increases, the oil temperature increases at a faster rate.

If an affirmative determination is made in step S12, the process of step S5A is performed, whereupon the routine returns to step S1. The process of step S5A is identical to the process of step S5. In step S5 and step S5A, the port of the temperature sensitive valve 72 is opened so that a part of the oil in the casing 7 is drawn into the oil pump 15 through the oil passage 66 and the oil passage 71. If a negative determination is made in step S12, on the other hand, the routine returns to step S1 via step S6. The process of step S6 is identical to the process of step S6 in FIG. 5, and therefore overheating of the torque converter 3 is prevented. Further, in parallel with the process of step S2 or the process of step S5 or step S5A, the oil temperature detected by the oil temperature sensor 69 may be used to control the pressure modulation characteristic of the electromagnetic control valve 70. In other words, oil temperature detection for opening and closing the port of the temperature sensitive valve 72 and oil temperature detection for controlling the electromagnetic control valve 70 may be performed by the same oil temperature sensor 69, and therefore it is not necessary to increase the number of components.

Figure 9:
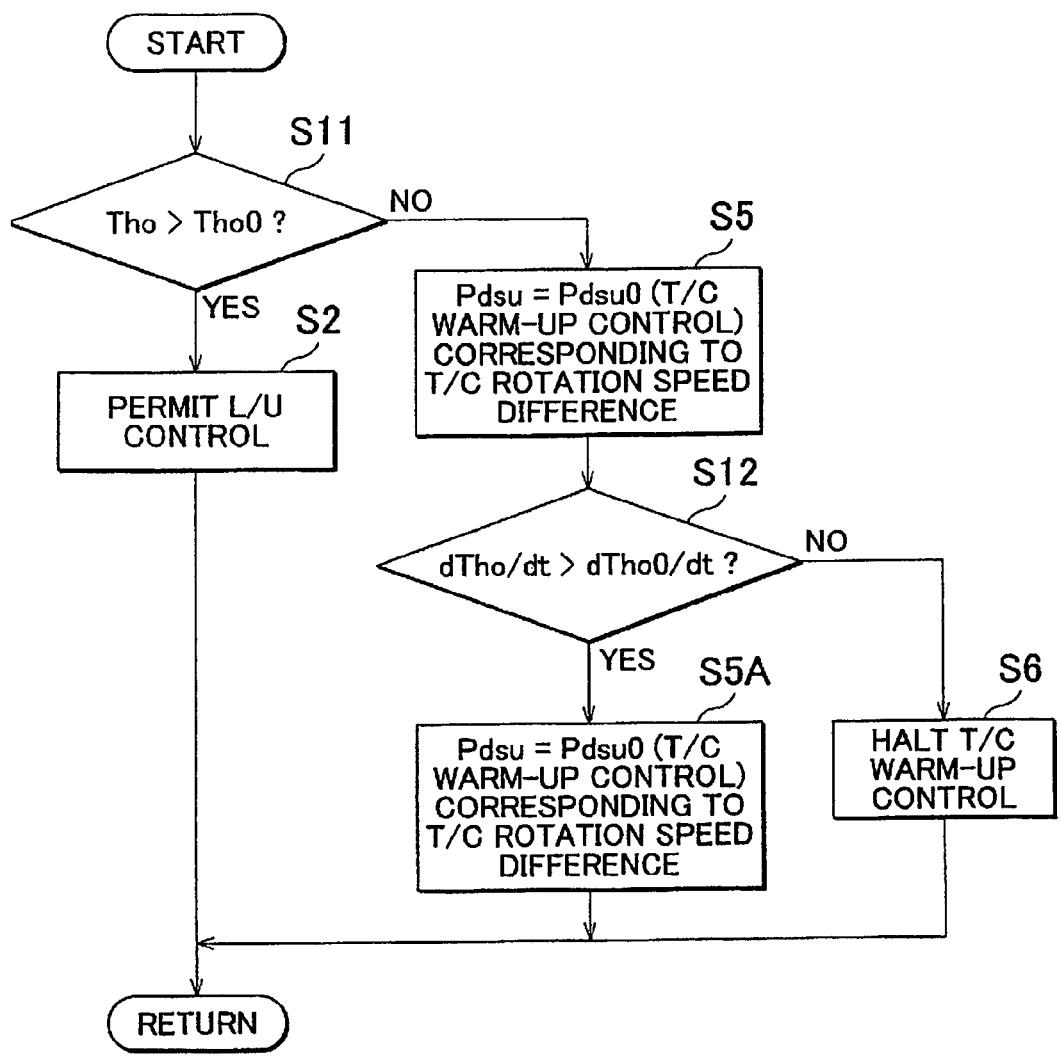
FIG. 9 is a flowchart showing an example of control executed by the hydraulic control apparatus according to the fourth embodiment of the invention.

Here, step S11 shown in FIG. 9 serves as an example of a function of an oil temperature measurement apparatus according to the invention, and step S5 or step S5A serves as an example of a function of a return apparatus according to the invention. Further, the predetermined temperature Tho0 serves as an example of a predetermined oil temperature according to the invention. Furthermore, step S11 serves as an example of a function of the oil temperature measurement apparatus according to the invention, steps S5 and S5A serve as an example of a function of the warming apparatus according to the invention, and step S2 serves as an example of a function of the prohibition apparatus according to the invention.

Figure 12:
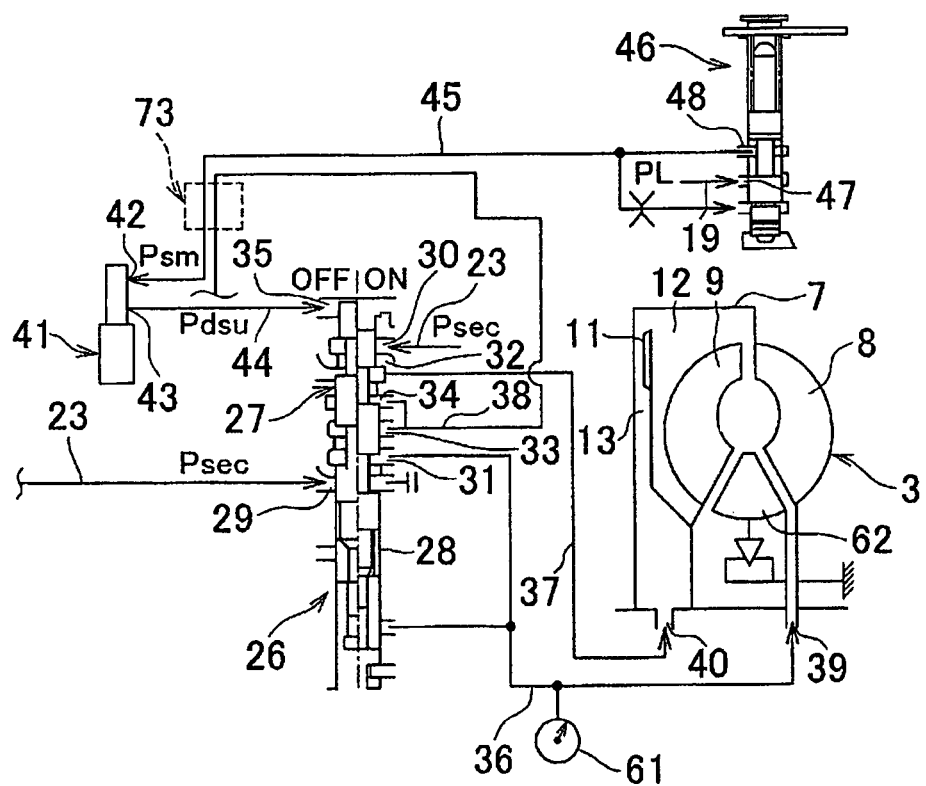
FIG. 12 is a partial schematic diagram showing a hydraulic control apparatus according to a fifth embodiment of the invention.

Next, a fifth embodiment of the hydraulic control apparatus 14 will be described with reference to FIG. 12. In FIG. 12, constituent parts identical to those shown in FIG. 1 are designated using identical reference symbols. In FIG. 12, the oil passage 49 and the temperature sensitive valve 50 shown in FIG. 1 are not provided. In FIG. 12, a heat exchanger 73 is provided for transferring the heat of the oil in the oil passage 38 to the oil passage 45. The heat exchanger 73 is a well-known heat pipe, for example, which transfers the heat of the oil in the oil passage 38 to the oil passage 45 if the oil temperature of the input port 42 is below a predetermined temperature, and does not transmit the heat of the oil passage 38 to the oil passage 45 if the oil temperature of the input port 42 equals or exceeds the predetermined temperature. More specifically, a thermal insulation shutter (not shown) that is activated based on the temperature of the input port 42 may be provided between the oil passage 38 and the oil passage 45.

In the fifth embodiment, actions and effects similar to those of the first embodiment are obtained in relation to constituent parts identical to those of the first embodiment. Further, in the fifth embodiment, the oil in the casing 7 is supplied to the oil passage 38, and the heat of the oil in the oil passage 38 is transferred to the oil in the oil passage 45 via the heat exchanger 73. Therefore, effects similar to those of the first embodiment are obtained. In the fifth embodiment, heat is transferred between the oil in the oil passage 38 and the oil in the oil passage 45 without contact. The oil passage 38 and the heat exchanger 73 serve as an example of the switching apparatus according to the invention. All other constituents of the fifth embodiment are identical to their counterparts of the first embodiment.

Figure 13:
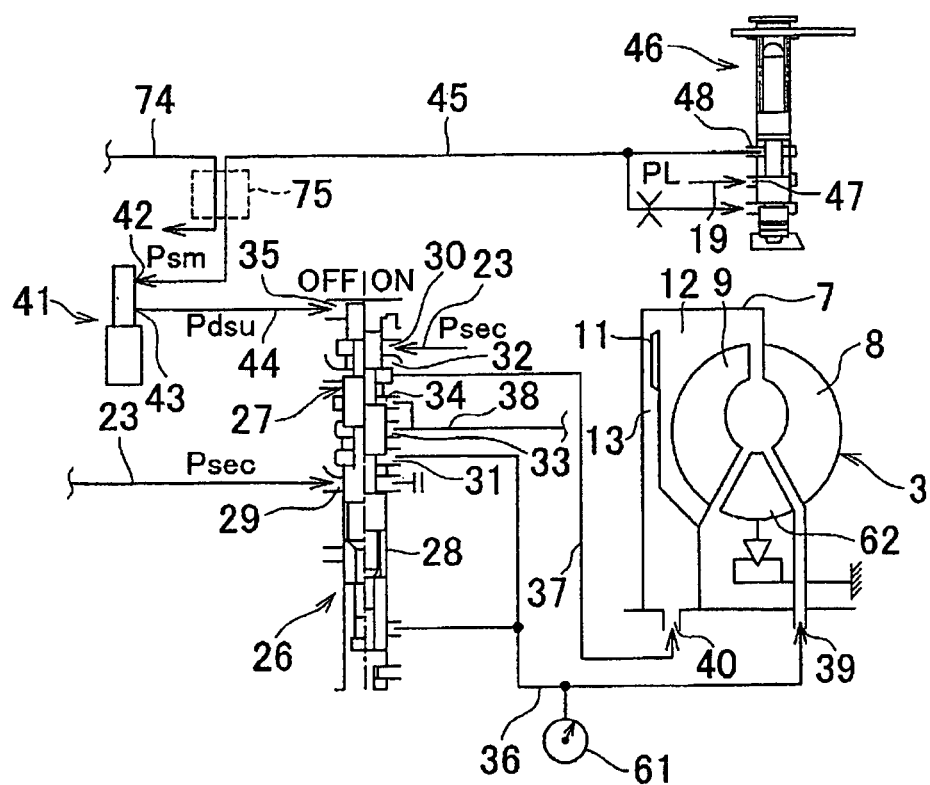
FIG. 13 is a partial schematic diagram showing a hydraulic control apparatus according to a sixth embodiment of the invention.

Next, a sixth embodiment of the hydraulic control apparatus 14 will be described with reference to FIG. 13. In FIG. 13, constituents identical to those shown in FIG. 1 are designated using identical reference symbols. In FIG. 13, the oil passage 49 and the temperature sensitive valve 50 shown in FIG. 1 are not provided. In FIG. 13, an oil passage 74 through which the oil ejected into the oil passage 19 passes after passing through a warmer (not shown) is provided, and a heat exchanger 75 is provided to transmit the heat of the oil in the oil passage 74 to the oil passage 45. The heat exchanger 75 may be a well-known heat pipe, for example, that applies the thermal energy of the oil in the oil passage 74 to the oil in the oil passage 45, thereby raising the temperature of the oil in the oil passage 45, when the oil temperature of the input port 42 is below a predetermined temperature, and does not transmit the thermal energy of the oil passage 74 to the oil in the oil passage 45 when the oil temperature of the input port 42 equals or exceeds the predetermined temperature. More specifically, a thermal insulation shutter (not shown) that is activated based on the temperature of the input port 42 may be provided between the oil passage 74 and the oil passage 45.

In the sixth embodiment, actions and effects similar to those of the first embodiment are obtained in relation to constituent parts identical to those of the first embodiment. Further, in the sixth embodiment, the heat of the oil in the oil passage 74 is transferred to the oil in the oil passage 45 via the heat exchanger 75, and therefore effects similar to those of the first embodiment are obtained. In the sixth embodiment, heat exchange occurs between the oil in the oil passage 74 and the oil in the oil passage 45 without contact. The oil passage 74 and the heat exchanger 75 serve as an example of the switching apparatus according to the invention. All other constituents of the sixth embodiment are identical to their counterparts of the first embodiment.

Figure 14:
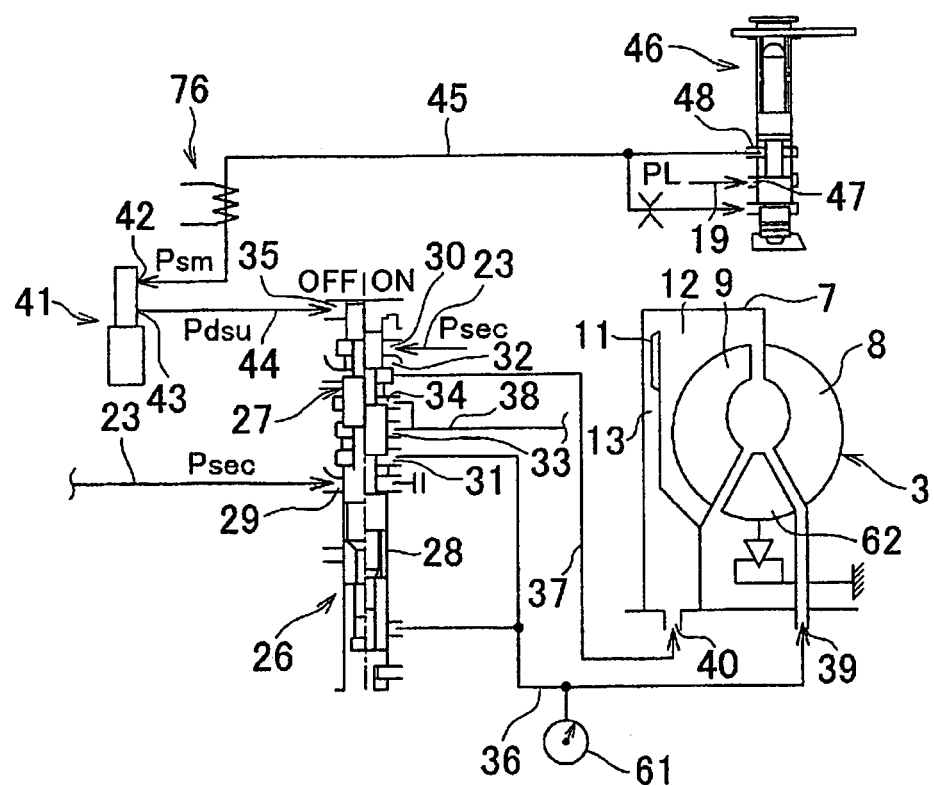
FIG. 14 is a partial schematic diagram showing a hydraulic control apparatus according to a seventh embodiment of the invention.

Next, a seventh embodiment of the hydraulic control apparatus 14 will be described with reference to FIG. 14. In FIG. 14, constituents identical to those shown in FIG. 1 designated using identical reference symbols. In FIG. 14, the oil passage 49 and the temperature sensitive valve 50 shown in FIG. 1 are not provided. In FIG. 14, a heating wire (heater) 76 is provided to heat the oil in the oil passage 45. The heating wire 76 is connected to a storage apparatus (not shown), and energization and de-energization of the heating wire 76 is controlled by the electronic control apparatus 60. More specifically, if the oil temperature Tsm of the input port 42 is below the predetermined oil temperature Tsm0, the heating wire 76 is energized to generate heat, whereupon the resulting thermal energy is used to heat the oil in the oil passage 45 and the oil temperature is increased. If the oil temperature Tsm of the input port 42 is equal to or above the predetermined oil temperature Tsm0, on the other hand, the heating wire 76 is not energized, and therefore thermal energy is not applied to the oil in the oil passage 45. Hence, in the seventh embodiment, actions and effects similar to those of the first embodiment are obtained. Note that in the seventh embodiment, similar effects to those of the first embodiment are obtained in relation to identical constitutional parts to those of the first embodiment. The heating wire 76 and the electronic control apparatus 60 serve as an example of the switching apparatus according to the invention. All other constituents of the seventh embodiment are identical to their counterparts of the first embodiment.

Note that in each embodiment described above, the oil temperature is detected directly by an oil temperature sensor, but the invention may also encompass a constitution in which an outside air temperature sensor is provided such that the oil temperature is estimated indirectly from a signal output by this sensor, and a constitution in which a sensor that detects the coolant temperature of the engine is provided such that the oil temperature is estimated indirectly from a signal output by this sensor.

The invention claimed is:
1. A hydraulic control apparatus comprising:
a fluid transmission apparatus that includes a casing in which a first rotary member and a second rotary member are housed, the fluid transmission apparatus transferring power between the first rotary member and the second rotary member using kinetic energy of oil supplied to the casing;
a lockup clutch that is provided in parallel with the fluid transmission apparatus, the lockup clutch being engaged or disengaged in order to control a torque transmitted between the first rotary member and the second rotary member;
an engagement hydraulic chamber that engages the lockup clutch when an oil pressure is supplied to the engagement hydraulic chamber;
a disengagement hydraulic chamber that disengages the lockup clutch when the oil pressure is supplied to the disengagement hydraulic chamber;
a clutch control valve that is provided in a passage supplying the oil pressure into the engagement hydraulic chamber and the disengagement hydraulic chamber, the clutch control valve switching between a first state in which an oil pressure in the engagement hydraulic chamber is increased and a second state in which an oil pressure in the disengagement hydraulic chamber is increased;
a signal oil pressure generation apparatus that outputs a signal oil pressure to switch the clutch control valve between the first state and the second state, the signal oil pressure generation apparatus controlling the signal oil pressure by regulating an input oil pressure of oil input into the signal oil pressure generation apparatus; and
a switching apparatus that selectively switches between a control in which thermal energy is applied to the oil input into the signal oil pressure generation apparatus when a temperature of the oil input into the signal oil pressure generation apparatus is below a predetermined oil temperature and a control in which thermal energy is not applied to the oil input into the signal oil pressure generation apparatus when the temperature of the oil input into the signal oil pressure generation apparatus equals or exceeds the predetermined oil temperature.

2. The hydraulic control apparatus according to claim 1, wherein the switching apparatus comprises a valve that opens when a temperature of the oil input into the signal oil pressure generation apparatus is below the predetermined temperature, so that oil in an oil passage flows into the signal oil pressure generation apparatus and thermal energy is applied to the oil input into the signal oil pressure generation apparatus, and that is closed when the temperature of the oil input into the signal oil pressure generation apparatus equals or exceeds the predetermined temperature, so that thermal energy is not applied to the oil input into the signal oil pressure generation apparatus.

3. The hydraulic control apparatus according to claim 2, further comprising:
a warming apparatus that executes a warming control to increase a temperature of the oil that is supplied to the fluid transmission apparatus by circulating the oil through a closed circulation circuit;
a condition determination apparatus for determining whether a condition for opening the valve is satisfied based on whether the temperature of the oil input into the signal oil pressure generation apparatus is below the predetermined temperature; and
a warming control apparatus that executes the warming control if a rate of temperature change of the oil in the oil passage exceeds a predetermined value and the condition for opening the valve is satisfied, and prohibits the warming control if the rate of change in the temperature of the oil in the oil passage is equal to or below the predetermined value.

4. The hydraulic control apparatus according to claim 3, further comprising:

an oil pump having a suction port that draws the oil to be supplied to the fluid transmission apparatus and an ejection port that ejects the drawn oil to supply the fluid transmission apparatus; and a return oil passage for returning a portion of the oil in the oil passage to the suction port.

5. The hydraulic control apparatus according to claim 3, further comprising:

an oil pump having a suction port that draws the oil to be supplied to the fluid transmission apparatus and an ejection port that ejects the drawn oil to supply the fluid transmission apparatus; and a return oil passage for returning a portion of the oil in the oil passage to the suction port.

6. The hydraulic control apparatus according to claim 5, further comprising:

an oil temperature measurement apparatus for measuring a temperature of the oil that is ejected from the ejection port of the oil pump; and a return apparatus that returns a portion of the oil in the oil passage to the suction port through the return oil passage if the measured oil temperature is equal to or below a predetermined reference oil temperature.

7. The hydraulic control apparatus according to claim 5, wherein the switching apparatus comprises a heat exchanger that applies thermal energy to the oil input into the signal oil pressure generation apparatus by exchanging heat between the oil in the oil passage that is discharged into the oil passage from the casing and the oil input into the signal oil pressure generation apparatus.

8. The hydraulic control apparatus according to claim 1, further comprising:

an oil pump for ejecting the oil supplied to the fluid transmission apparatus;

a warming apparatus that executes a warming control to increase a temperature of the oil that is supplied to the fluid transmission apparatus by circulating the oil through a closed circulation circuit;

an oil temperature measurement apparatus for measuring a temperature of the oil that is ejected from the oil pump; and a warming control apparatus that executes the warming control when the measured oil temperature of the oil is equal to or below a predetermined oil temperature, and prohibits execution of the warming control if the measured oil temperature of the oil exceeds the predetermined oil temperature.

9. The hydraulic control apparatus according to claim 1, wherein the switching apparatus comprises a heating wire that is energized to heat the oil that is input into the signal oil pressure generation apparatus.

10. The hydraulic control apparatus according to claim 1, wherein the lockup clutch sets the first rotary member and the second rotary member in an engaged state, a disengaged state, or a slip state.

11. The hydraulic control apparatus according to claim 1, further comprising:

an oil pump having a suction port that draws the oil to be supplied to the fluid transmission apparatus and an ejection port that ejects the drawn oil to supply the fluid transmission apparatus; and a return oil passage for returning a portion of oil in an oil passage to the suction port.

12. The hydraulic control apparatus according to claim 1, wherein the signal oil pressure generation apparatus is a duty solenoid valve that is configured to output a signal oil pressure based on a ratio between an energization and a de-energization thereof.

* * * * *